United States Patent [19]
Lewus

[11] 3,921,746
[45] Nov. 25, 1975

[54] AUXILIARY POWER SYSTEM FOR AUTOMOTIVE VEHICLE

[76] Inventor: Alexander J. Lewus, 9844 N. 11th Ave., Phoenix, Ariz. 85021

[22] Filed: Mar. 21, 1974

[21] Appl. No.: 453,293

Related U.S. Application Data

[63] Continuation-in-part of Ser. No. 313,242, Dec. 28, 1972, abandoned.

[52] U.S. Cl............................... 180/53 R; 417/231
[51] Int. Cl.². ........................................ B60K 25/10
[58] Field of Search.................... 417/211, 231, 233; 180/53 R, 65 R, 66 R, 66 B; 280/124 F; 320/2, 61; 188/266, 267, 314

[56] References Cited
UNITED STATES PATENTS

| | | | |
|---|---|---|---|
| 887,505 | 5/1908 | Nelson................................ | 417/211 |
| 1,116,293 | 11/1914 | Kane.................................... | 417/211 |
| 1,397,879 | 11/1921 | Pillmore............................ | 180/65 R |
| 1,752,844 | 4/1930 | Harrison........................ | 188/267 X |
| 3,062,330 | 11/1962 | Lyon................................ | 188/314 X |
| 3,507,580 | 4/1970 | Howard ............................ | 417/231 |
| 3,559,027 | 1/1971 | Arsem................................. | 320/61 |
| 3,666,038 | 5/1972 | Hudspeth.......................... | 180/66 B |

*Primary Examiner*—M. Henson Wood, Jr.
*Assistant Examiner*—Terrance L. Siemens
*Attorney, Agent, or Firm*—Kinzer, Plyer, Dorn & McEachran

[57] ABSTRACT

An auxiliary power and suspension system for an automotive vehicle comprising suspension means, power transmission means and power conversion means. The vehicle comprises a frame, a body mounted on the frame, auxiliary equipment on the body and several supporting wheels. The suspension means mounts the wheels on the vehicle frame and allows limited vertical movement of the wheels relative to the frame in response to changes in contour of terrain traversed by the wheels. The power transmission means which is connected to at least two wheels and the vehicle frame, is actuated in response to relative vertical movement therebetween. The power conversion means, which is connected to and actuated by the power transmission means converts mechanical kinetic energy applied by the power transmission means into another form of energy for use in operating the auxiliary equipment. The power conversion means comprises several double-acting cylinders, a reciprocal piston dividing each into two chambers, each chamber being connected through a transmission line with appropriate valves to a hydraulic motor actuated in response to hydraulic pressure in the cylinder chambers. The auxiliary power and suspension system alone supports the entire weight of the vehicle which acts on the vehicle wheels.

10 Claims, 7 Drawing Figures

3,921,746

AUXILIARY POWER SYSTEM FOR AUTOMOTIVE VEHICLE

CROSS REFERENCE TO RELATED APPLICATION

This is a continuation-in-part of application Ser. No. 313,242, filed Dec. 8, 1972, now abandoned.

BACKGROUND OF THE INVENTION

Modern automobiles are equipped with a wide variety of different forms of auxiliary equipment, usually electrically powered. This auxiliary equipment may include ventilators and heaters, complete air conditioning systems, electrically operated windows and windshield wipers, and many other types of apparatus. Auxiliary equipment of similar variety and complexity is utilized in other vehicles, including trucks, railroad cars, and the like. Thus, railroad cars may be equipped with special heaters or cooling equipment; the same may apply to trailers and other vehicle types. Throughout this specification and in the appended claims, the term "automotive vehicle" is employed in a generic sense to encompass ordinary automobiles, trucks, railroad locomotives and cars, trailers, and off-road vehicles as well.

Of course, the power to operate a heater, blower air conditioner, or other electrical appliance, on any automotive vehicle, must come from some source. The usual and conventional source is the engine that drives the vehicle. In some instances, as in certain railway lighting and heating equipment, the power may be derived from rotation of the wheels; in the long run, however, the actual source is still the vehicle engine, since this is what powers the rotating wheels. In many instances, the auxiliary equipment may constitute an appreciable power drain for the vehicle engine and may add materially to its cost of operation.

On the other hand, appreciable amounts of energy developed by many vehicles are completely wasted. The wheels of any vehicle moving over irregular terrain, or over terrain of changing contour, inevitably undergo appreciable vertical movement in addition to the desired movement across the terrain. Virtually all vehicles, at present, are equipped with springs and shock absorbers to minimize the vertical movements of the vehicle body, allowing limited vertical movement of the body relative to the vehicle wheels. These springs and shock absorbers must dispose of the energy represented by the vertical movements of the vehicle; the energy is ordinarily dissipated in the form of heat radiated to the surrounding atmosphere.

In one previous proposal, in Howard et al. U.S. Pat. No. 3,507,580, a limited part of the energy of vertical movement of an electric automobile is salvaged and used to aid in driving the vehicle. The Howard et al patent provides a pneumatic pump, connected in parallel with a suspension spring for the vehicle, which pumps air into a pressure reservoir. The pressurized air from the reservoir is used to drive one or more pneumatic motors used to operate a battery charger, a starter, or the like.

SUMMARY OF THE INVENTION

A principal object of the invention, therefore, is to provide a new and improved integral auxiliary power and suspension system that utilizes the energy potential of the vertical movements of an automotive vehicle, relative to the vehicle wheels, and converts that energy into a readily usable form for operation of auxiliary equipment on the vehicle.

A more specific object of the invention is to convert most or all of the vibratory and oscillatory vertical movements of an automotive vehicle, operating over terrain of irregular surface or of changing contour, into a form of energy that can be effectively employed for operation of auxiliary equipment on the vehicle, and at the same time to suppress the vertical movements of the vehicle body, affording effective shock absorption.

Another object of the invention is to adapt hydraulic shock absorbers for the generation of power output, in the course of normal operation of an automotive vehicle, without materially interferring with the shock absorption function.

Another object of the invention is to provide a new and improved integral auxiliary power and suspension system which will replace the conventional springs and shock absorbers of automotive vehicles.

A particular object of the invention is to provide a new and improved suspension-actuated power system for an automotive vehicle, which converts the mechanical kinetic energy of vertical movements of the vehicle frame relative to the vehicle wheels into a readily usable form, that is economical in construction and effective in operation both for power generation and shock absorption.

Accordingly, the invention relates to a suspension-actuated auxiliary power system for an automotive vehicle or the like, comprising a vehicle frame, a body mounted on the frame, auxiliary power-driven equipment for the vehicle, and a plurality of supporting wheels for the vehicle. The auxiliary power system comprises suspension means for mounting the wheels on the vehicle frame, the suspension means allowing limited vertical movement of the wheels relative to the frame in response to irregularities and changes in contour of terrain traversed by the wheels. Power transmission means are provided, connected to at least two of the wheels and to the vehicle frame, for actuation in response to relative vertical movements between the wheels and the frame. Power conversion means are connected to and actuated by the power transmission means, converting the mechanical kinetic energy applied to the power conversion means through the power transmission means into hydraulic pressure energy and ultimately into electrical energy for more ready utilization in operation of the aforesaid auxiliary equipment.

DESCRIPTION OF THE PREFERRED EMBODIMENTS

Figure 1:
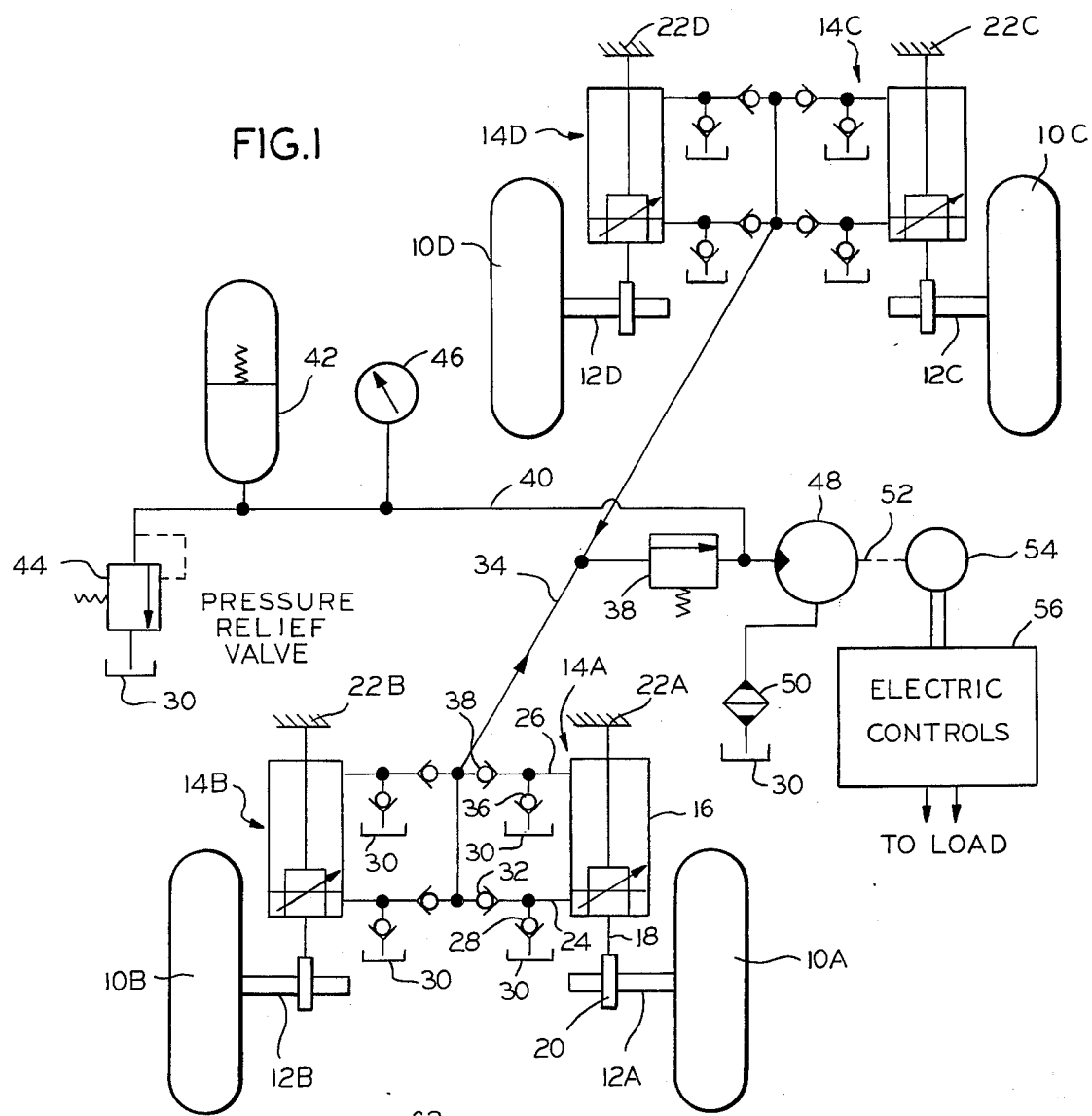
FIG. 1 is a schematic illustration of a suspension actuated auxiliary power system constructed in accordance with the present invention.

The apparatus schematically illustrated in FIG. 1 comprises the four wheels 10A, 10B, 10C and 10D of a vehicle, individually mounted on the vehicle axles 12A, 12B, 12C and 12D, respectively. A first major section 14A of the power system illustrated in FIG. 1, connected to wheel 10A, comprises a hydraulic pump 16 of the double acting adjustable cushion cylinder type. A link 18 connects pump 16 to a bearing member 20 mounted on the axle 12A for wheel 10A. Pump 16 is also connected to a member 22A that is a part of the vehicle frame. Pump 16 has two ports 24 and 26, each of which serve as both an inlet port and an outlet port. Port 24 of pump 16 is connected to a check valve 28 that is returned to a system reservoir 30. Port 24 is also connected, through another check valve 32, to a main hydraulic transmission line 34. Similarly, port 26 is connected through one check valve 36 to the reservoir 30 and is connected through a second check valve 38 to the main line 34.

The overall power system illustrated in FIG. 1 includes three additional sections 14B, 14C and 14D. Each of the power system sections 14B through 14D duplicates section 14A, so that no specific description of these sections is required. All sections of the power system are connected to the main hydraulic transmission line 34.

The main hydraulic line 34 is connected to an adjustable pressure control valve 38. The outlet of valve 38 is connected to a line 40 that leads to a spring-loaded accumulator 42. Line 40 is also connected to an adjustable pressure control valve 44 employed as a pressure relief valve and returned to the system reservoir 30. A pressure indicator 46 may be connected to line 40.

The output of control valve 38 is also connected to the inlet port of a hydraulic motor 48. The outlet port of motor 48 is connected to a hydraulic fluid cooler 50 that is returned to reservoir 30. Motor 48 has an output shaft 52 that drives an electrical generator 54. Generator 54 is electrically connected to a control unit 56 that is in turn connected to a battery or other load. The ultimate load for the system illustrated in FIG. 1 is the auxiliary equipment for the automotive vehicle in which the system is incorporated.

In considering the operation of the system shown in FIG. 1, it may be assumed that the vehicle in which the system is incorporated is moving across a road or other terrain affording, as usual, a number of irregularities and changes in contour which are encountered by the individual wheels 10A–10D as the vehicle movement continues. Referring to section 14A of the power system, when wheel 10A encounters a bump or other rising contour in the road, the piston in pump 16 is driven upwardly, due to the relative movement between the wheel 10A and frame member 22A. The upward movement of the piston forces hydraulic fluid outwardly of port 26 and through check valve 38 into the main line 34. Furthermore, as the cylinder moves upwardly, fluid is drawn into pump 16 from reservoir 30 through check valve 28 and port 24.

When wheel 10A encounters a downward change in terrain and moves downwardly relative to frame member 22A, the reverse action occurs. Thus, hydraulic fluid is drawn from reservoir 30, through check valve 36 and port 26, into the upper portion of the pump cylinder. At the same time, fluid is forced outwardly of port 24 through check valve 32 into main line 34. The check valve arrangement, comprising valves 28, 32, 36 and 38, prevents pump 16 from pumping hydraulic fluid to the reservoir 30 and also prevents the pump from drawing fluid from line 34.

The same action occurs at each of the other power system sections 14B, through 14D, as each of the wheels 10B through 10D moves vertically, upwardly or downwardly, with respect to the auxiliary frame members 22B through 22D. Thus, in each of the power system sections 14A through 14D, the vertical mechanical movement of the vehicle wheels is converted in form to the pumping of hydraulic fluid under pressure into line 34.

Whenever the hydraulic fluid pressure in line 34 exceeds a predetermined minimum level, established by the setting of control valve 38, the fluid is discharged from line 34 through valve 38 to motor 48, actuating the motor and rotating its output shaft 52. This drives electrical generator 54, converting the available power to electrical energy that is supplied to a battery or other load through the electrical controls 56. Whenever the rate of flow of fluid from line 34 through valve 38 exceeds the rate at which motor 48 can utilize the fluid, the excess is stored in accumulator 42. Subsequently, when the vehicle is stopped, or even when a very smooth portion of road is encountered, the fluid stored under pressure in accumulator 42 feeds back through line 40 to motor 48 and continues the operation of the system in driving generator 54. At any time, if the pressure in accumulator 42 and line 40 exceeds a given safe level, the fluid is diverted back to reservoir 30 through the pressure relief valve 44.

In the complete four-wheel hydraulic system shown in FIG. 1, there are no springs interconnecting the vehicle wheels 10A–10D with the auxiliary frame members 22A–22D. In this system, each hydraulic pump 16 serves a dual purpose, functioning as both a spring and as a shock absorber, thus affording an all-hydraulic suspension system. That is, the entire vehicle frame is suspended on the four double-acting cylinders, which may be adjusted to afford a hydraulic cushion at both top and bottom of each cylinder when in their normal positions. The major portion of the energy involved in the vertical movements of all of the wheels of the vehicle is converted to readily usable electrical form, instead of being dissipated as heat as in conventional suspension apparatus. Since no suspension springs are employed, and a hydraulic conversion is effected, the recovery of energy from the vertical movements of the vehicle is quite efficient and aids materially in reducing the overall fuel consumption of the vehicle.

Figure 2:
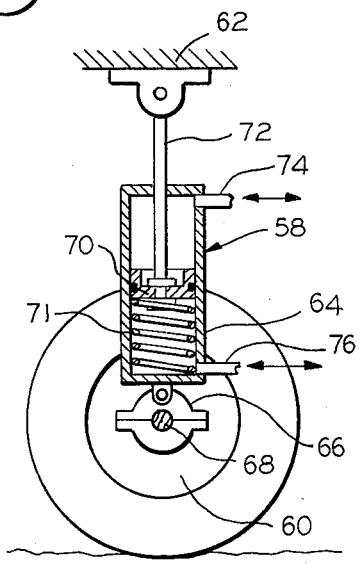
FIG. 2 is an elevation view, partly in cross-section, of a power conversion device including a suspension spring.
Figure 3:
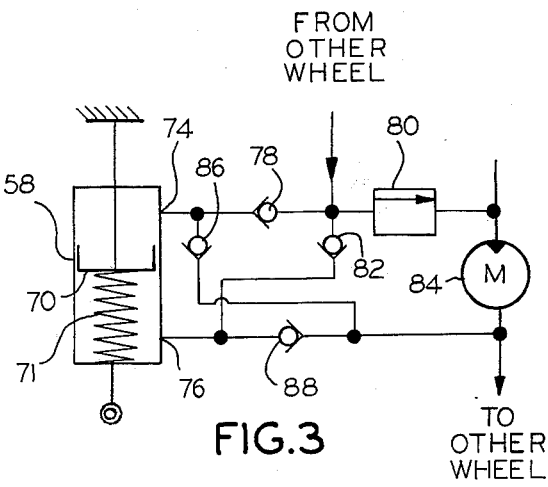
FIG. 3 is a schematic illustration of a portion of a modified form of the invention including the power conversion device of FIG. 2.

Another embodiment of the invention is illustrated in FIGS. 2 and 3. A hydraulic pump 58 of the double-acting cylinder type (FIG. 2) is interposed between a vehicle wheel 60 and a frame bracket 62 which is rigidly mounted to a part of the vehicle frame. The housing 64 of pump 58 is rotatably connected to a bearing member 66 mounted on the vehicle axle 68 for wheel 60. A piston 70, which is free to reciprocate vertically within the cylindrical pump housing 64, is secured to one end of a piston rod 72 which is rotatably connected at its other end to the frame bracket 62. Pump 58 has two ports 74 and 76, each of which serve as both an inlet port and an outlet port.

Port 74 is connected to a check valve 78 (FIG. 3) which, in turn, is connected to an adjustable pressure control valve 80. Port 76 is also connected to the pressure control valve 80 through a check valve 82. The outlet of valve 80 is connected to the inlet port of a hydraulic motor 84. Motor 84 is adapted to perform the same function as the motor 48 described above in connection with FIG. 1. The outlet port of motor 84 communicates with both ports 74 and 76, through check valves 86 and 88 respectively.

Although only a single hydraulic pump 58 is shown in FIG. 3, it is to be understood that another pump is similarly installed on at least one other vehicle wheel; preferably, a pump is installed on each independent axle of the vehicle. The ports of these additional pumps are connected to the portion of the auxiliary power system shown in FIG. 3 at the inlet port of the pressure control valve and outlet port of the hydraulic motor 84 respectively, with check valves like valves 78, 82, 86 and 88, and similar connections, for each pump.

A helical compression spring 71 is disposed within the pump housing 64 below the piston 70. Spring 71 contributes to the support of the vehicle weight, which acts directly on piston 70.

In operation, as the vehicle travels over an irregular surface, the pump housing 64 is displaced vertically in direct relationship to the displacement of wheel 60, thereby causing the piston 70 to reciprocate in housing 64. Upward movement of piston 70, responsive to downward movement of wheel 60, forces hydraulic fluid out of port 74, through check valve 78 to the pressure control valve 80. When the pressure exceeds the predetermined minimum level, as determined by the setting of control valve 80, the fluid is forced to actuate motor 84. The fluid discharged from motor 84 is drawn back into pump 58 below the piston 70, through port 76.

Likewise, when wheel 60 is forced upward relative to the vehicle frame, piston 70 is depressed downward within pump 58, thereby compressing spring 71 and forcing fluid out of port 76. The hydraulic fluid is forced through check valve 82 and pressure control valve 80 to actuate motor 84. In this situation, the fluid discharged from motor 84 is drawn through check valve 86 into the upper portion of the pump 58, through port 74.

The auxiliary power and suspension system shown in FIGS. 2 and 3 is responsive to even small vertical displacements of the piston 70 to perform work by the motor 84. In this connection, it is to be understood that all of the hydraulic fluid containing members and passages are completely filled with fluid so that the system is fluid tight with no air pockets therein.

Figure 4:
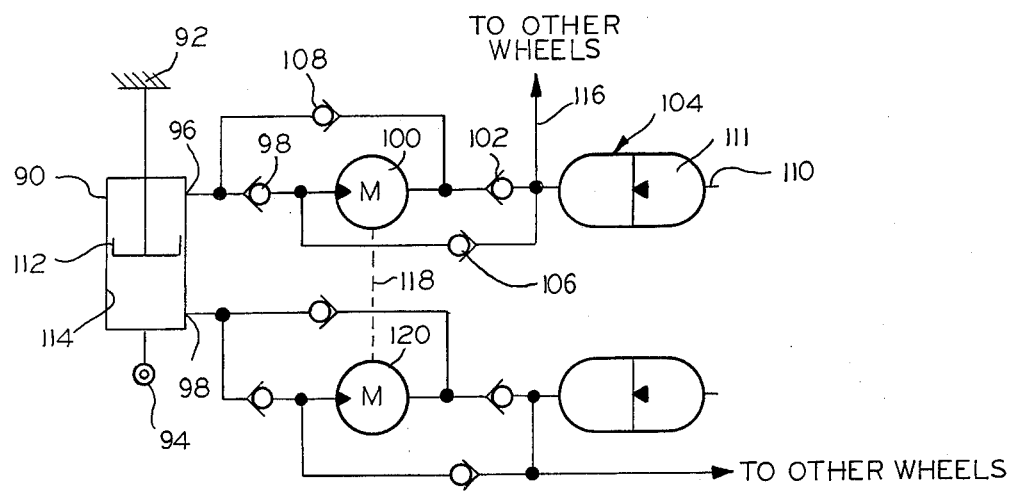
FIG. 4 is a schematic illustration of a portion of a suspension-actuated auxiliary power system constructed in accordance with another embodiment of the invention.

FIG. 4 illustrates another embodiment of the invention, in which separate motors are actuated by the hydraulic pressure from the upper chamber and lower chambers of a double-acting cylinder. A hydraulic pump 90 of the double-acting adjustable cushion cylinder type is installed between the vehicle frame 92 and the bearing member 94 in the same manner as the hydraulic pump 16 shown in FIG. 1. Inlet-outlet ports 96 and 98 are provided for the upper and lower chambers of pump 90 respectively. Port 96 is connected through a check valve 98 to the inlet port of a hydraulic motor 100. The outlet port of motor 100 is connected through another check valve 102 to a spring-loaded accumulator 104 which, in turn, is connected through a check valve 106 to the inlet of motor 100. The outlet port of motor 100 is also connected through a return check valve 108 to port 96. Accumulator 104 is provided with an air valve 110 for pressurizing the load side 111 of accumulator 104.

Pump 90, which comprises a piston 112 reciprocal within a cylindrical housing 114, is divided into upper and lower chambers by the piston 112. The hydraulic pressure system just described communicates only with the upper chamber of pump 90. Likewise, the upper chamber of each of the hydraulic pumps which are installed on the other wheels of the vehicle are interconnected into this single hydraulic pressure system through transmission line 116 and appropriate check valves installed similar to valves 98 and 108. Another hydraulic pressure system, identical to the above described system, interconnects the lower chambers of each of the hydraulic pumps installed on the vehicle. The motor 120 actuated by this pressure system is connected in series with motor 100, as indicated by line 118, which represents their common output shaft.

In operation, the hydraulic pressure system shown in FIG. 4 responds similarly to oppositely directed vertical movements of the pistons within the pumps installed on the vehicle. Thus, whenever piston 112 is forced upward in cylinder 114, hydraulic fluid is forced out of port 96 and through check valve 98, thereby actuating motor 100. Fluid discharged from motor 100 passes through check valve 102 to be stored in accumulator 104 until piston 112 again moves downward. Upon such downward movement of piston 112, the air pressure in accumulator 104 forces the fluid stored therein to pass through check valve 106 and again through motor 100. Fluid discharged from motor 100 is drawn through check valve 108 and port 96 into the upper chamber of cylinder 114 by the vacuum formed by the downward moving piston 112. Corresponding responses occur in the pressure system associated with the lower chambers of the hydraulic pumps, such as pump 90, but for oppositely directed movements of the piston 112 within cylinder 114.

Like the pressure system shown in FIG. 3, the hydraulic pressure system of FIG. 4 is completely filled with hydraulic fluid but has the added feature that the pressure therein may be present and adjusted by the air pressure applied to the accumulators through their respective air valves. The amount of pressure applied by the accumulators determines the equilibrium position of piston 112 within the cylinder 114 and thus establishes the normal height of the vehicle relative to its wheels. Since only one accumulator is used for each of the two pressure systems which communicate with each pump installed on the vehicle, the accumulators serve to level the vehicle by applying equalized pressures to each of the hydraulic pumps.

Figure 5:
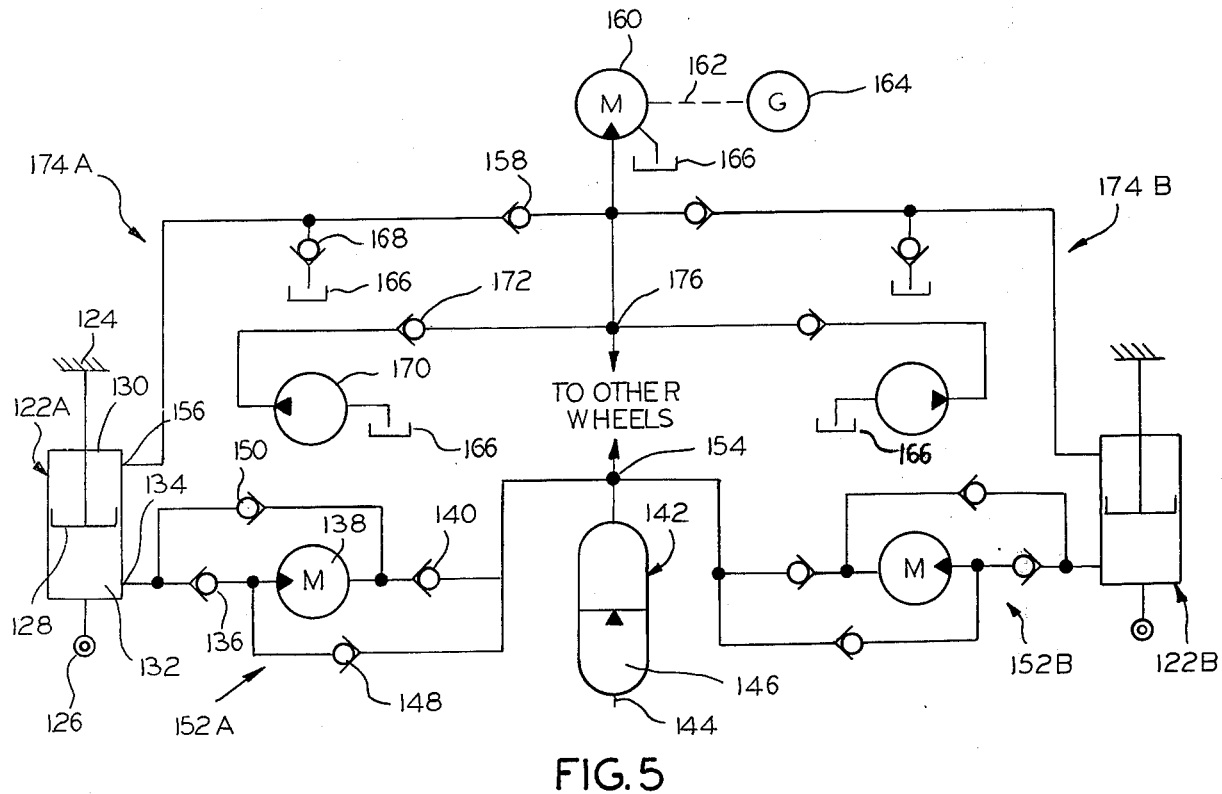
FIG. 5 is a schematic illustration of a portion of a suspension-actuated auxiliary power system constructed in accordance with a further embodiment of the invention.

FIG. 5 shows another embodiment of the invention which has separate hydraulic power systems for the upper and lower chambers, respectively, of the hydraulic pumps. A hydraulic pump 122A of the double-acting cushion cylinder type is installed between the automotive frame 124 and bearing means 126 associated with one of the vehicle wheels, in a system section 152A. A piston 128, reciprocal within the housing of pump 122, divides the pump into upper and lower chambers 130 and 132. An inlet-outlet port 134 for the lower chamber 132 is connected through a check valve 136 to the inlet of hydraulic motor 138. The outlet of motor 138 is connected through a check valve 140 to an air pressure hydraulic accumulator 142. Accumulator 142 is provided with an air valve 144 for regulating the pressure in the load side 146 of the accumulator 142. Accumulator 142 is also connected through a return check valve 148 to the inlet of motor 138 and the outlet of motor 138 is connected, through a bypass check valve 150 and port 134, to the lower chamber of pump 122A.

A second hydraulic pressure system section 152B, essentially similar to section 152A, including a second hydraulic pump 122B, is also shown in FIG. 5. Likewise, further similar hydraulic pressure system sections will be provided for the lower chambers of each additional hydraulic pump installed on other wheels of the vehicle. The additional hydraulic pressure system sections are connected to the pressure system sections 152A and 152B at point 154, and all of the system sections so connected are served by the single accumulator 142.

The upper chamber 130 of hydraulic pump 122A is connected through an inlet-outlet port 156 and a check valve 158 to the inlet of a hydraulic motor 160. The output shaft of motor 60, indicated by line 162, drives an electrical generator 164. Hydraulic fluid discharged from motor 160 is returned to a system reservoir 166. Reservoir 166 is also connected, through a return check valve 168 and port 156, to the upper chamber 130 of hydraulic pump 122A. In addition, a rotary hydraulic pump 170 is connected in series with the hydraulic motor 138 of pressure system 152A. The inlet to rotary pump 170 is connected to the system reservoir 166 and the pump outlet is connected through check valve 172 to the inlet of motor 160.

Referring generally to the hydraulic pressure system associated with the upper chamber of pump 122A by the reference character 174A, which includes upper chamber 130, rotary pump 170, and motor 160 as well as the various valve and transmission lines interconnecting the same, it will be noted that a corresponding pressure system 174B is provided for the upper chamber of hydraulic pump 122B. Additional similar power systems associated with other hydraulic pumps installed on other wheels of the vehicle may be connected to pressure systems 174A and 174B at point 176. Like hydraulic pressure accumulator 142 in the pressure systems for the lower chambers, hydraulic motor 160 is the sole motor provided for all of the pressure systems associated with the upper chambers of the various hydraulic pumps.

In operation, hydraulic pressure systems 152A and 152B will respond to the actuation of pumps 122A and 122B in the same manner as the hydraulic pressure systems described above in connection with FIG. 4. Similarly, the pressure in hydraulic fluid accumulator 142 may be regulated through air valve 144. The hydraulic pressure systems 152A and 152B are not connected to the system reservoir 166, but rather are completely filled with fluid and are fluid tight so that the pressure applied to accumulator 142 is transmitted to the lower chambers of the various hydraulic pumps, thereby regulating the equilibrium position of the pistons within the pumps and, in turn, the height of the vehical relative to its wheels.

The output shaft of motor 138, FIG. 5, however, is connected in series with the rotary hydraulic pump 170 rather than with another motor as shown in FIG. 4. Thus, actuation of motor 138 drives rotary pump 170, causing hydraulic fluid to be drawn from the system reservoir 166 and to be forced through check valve 172 to actuate motor 160.

Referring now to pressure system 174A, as the vehicle wheel associated with pump 122A traverses a depression in the road surface, piston 128 is forced upward within pump 122A. The hydraulic fluid in the upper chamber 130 is then forced through port 156 and check valve 158 to actuate motor 160, which drives the generator 164, thereby producing electrical energy. The fluid discharged by motor 160 is returned to the system reservoir 166.

Upon downward movement of piston 128 within pump pump 122A, a vacuum is formed in the upper chamber 130 drawing fluid from reservoir 166 through check valve 168 so as to refill the upper chamber 130 as it returns toward its equilibrium position. It is to be understood that hydraulic pressure system 174B and any other pressure systems associated with the upper chambers of hydraulic pumps installed on the vehicle operate in the same manner as pressure system 174A.

Thus, all of the pressure systems 152A, 152B, 174A and 174B drive the single hydraulic motor 160, which converts the hydraulic pressure energy into useful electrical energy through generator 164. Whereas pressure systems 174A and 174B are directly connected to motor 160, pressure systems 152A and 152B are only indirectly connected. The hydraulic motors of the pressure systems 152A and 152B are used to actuate rotary hydraulic pumps which in turn produce the hydraulic pressure energy needed for actuating motor 160.

Figure 6:
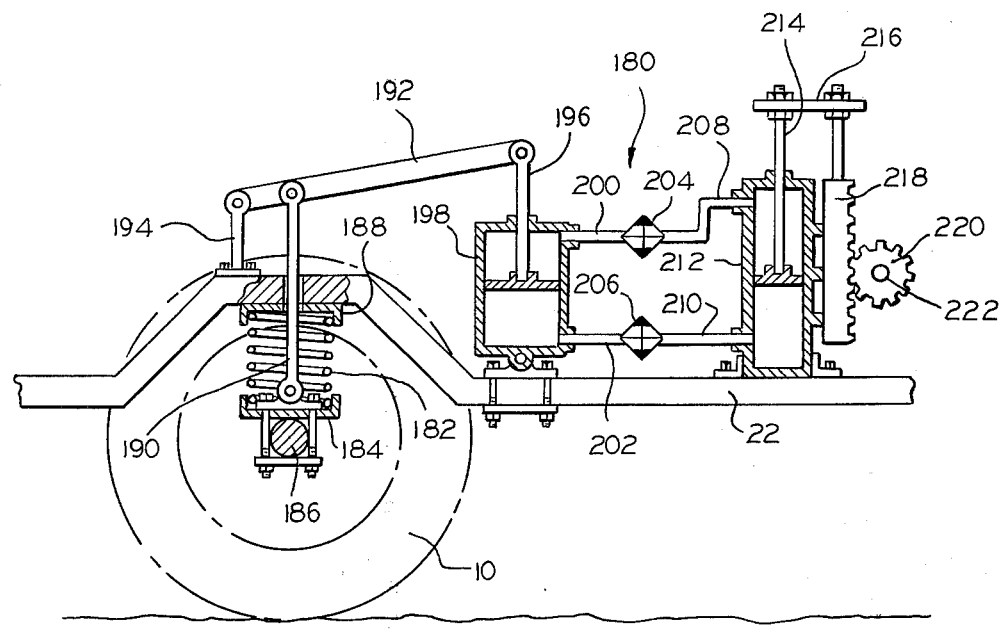
FIG. 6 is an elevation view, partly in cross-section of another embodiment of the invention in which the power transmission means includes leverage means.

FIG. 6 illustrates a system 180 that combines some of the features of the previously described systems in a further integral auxiliary power and suspension system constructed in accordance with the present invention. In FIG. 6, the vehicle wheel 10 is again mounted on a vehicle frame 22 by a coil spring suspension comrpising a spring 182 having its lower end mounted in a retainer 184 that is in turn mounted on the wheel axle 186. The upper end of spring 182 is seated in a retainer 188 affixed to the vehicle frame 22.

System 180 comprises a power transmission link 190 having its lower end connected to the spring retainer 184 on axle 186. The upper end of link 190 is pivotally connected to an intermediate point on a crank arm 192. One end of crank 192 is pivotally connected to a standard 194 mounted on frame 22. The other end of crank 192 is pivotally connected to a piston rod 196 for a double-acting piston pump 198 that is mounted on frame 22. Pump 198 has two ports 200 and 202 that are connected through two oil coolers 204 and 206 to the ports 208 and 210, respectively, of a double-acting cylinder 212. The piston rod 214 for cylinder 93 is connected, through a connecting member 216, to a rack member 218 that engages a pinion gear 220 mounted on an output shaft 222. Shaft 222 may be connected to an electrical generator or other suitable auxiliary load.

In operation, power system 180 is actuated by vertical relative movement between wheel 10 and frame 22.

When wheel 10 moves upwardly relative to frame 22, the transmission link 190 is driven upwardly and crank 192 is pivoted in a counterclockwise direction, lifting the piston in pump 198 and forcing fluid under pressure out of port 200 and into cylinder 212 through port 208. This drives the piston in cylinder 212 downwardly and thus drives rack 218 downwardly, rotating pinion gear 220 and shaft 222 in a counterclockwise direction.

On the reverse movement of transmission link 190, in a downward direction, crank 192 pivots in a clockwise direction and drives the piston in pump 198 downwardly. This forces fluid out of port 202 and into cylinder 212 through port 210, moving the piston rod 214 upwardly. Rack 218 is also moved upwardly, driving pinion gear 220 and shaft 222 clockwise. It is thus seen that power system 180 may be utilized in much the same manner as the previously described systems, affording a shock absorption action for the movement of wheel 10 and converting the vertical movements of the wheel into useful energy that may be employed to charge storage batteries or otherwise to actuate auxiliary equipment for the vehicle in which the system is incorporated.

Figure 7:
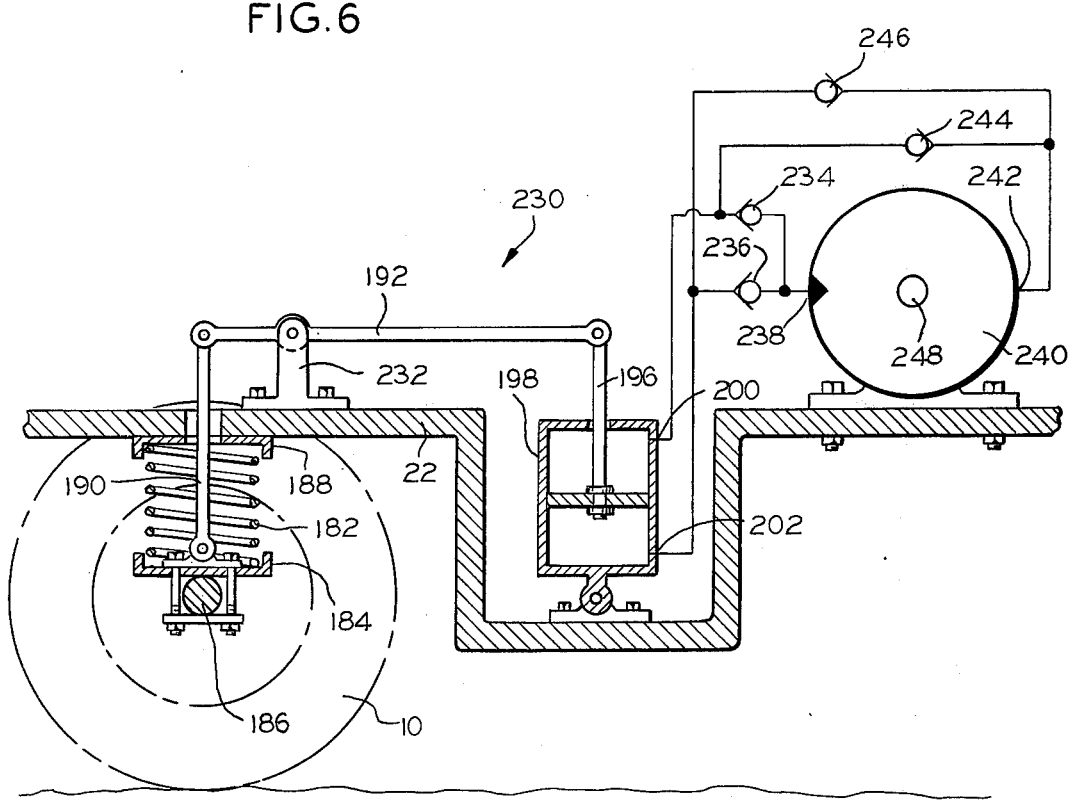
FIG. 7 is a view, similar to FIG. 6, of a further modified form of the invention.

FIG. 7 illustrates a system 230 which is a further modified form of the present invention, similar to system 180 shown in FIG. 6. In FIG. 7, a coil spring suspension identical to that shown in FIG. 6 mounts the vehicle wheel 10 on a vehicle frame 22. The coil spring suspension again comprises a spring 182, a lower retainer 184 mounted on the wheel axle 186 and an upper retainer 188 affixed to the vehicle frame 22.

In power system 230, the power transmission link 190 again has its lower end connected to the spring retainer 184 on axle 186. The upper end of link 190 however, is pivotally connected to one end of a crank 192A. The other end of crank 192A is pivotally connected to a piston rod 196 for a double-acting piston pump 198 that is mounted on frame 22. In this instance a standard 232 is rigidly affixed to the vehicle frame 22 below a point intermediate the length of the crank arm 192A, crank arm 192A being pivotally connected to the standard 232 at a point adjacent the same end of crank 192A.

Pump 198 has two ports 200 and 202 that are connected through check valves 234 and 236 to the inlet port 238 of hydraulic motor 240. The outlet port 242 of motor 240 is connected, through return check valves 244 and 246, to ports 200 and 202. The output shaft 248 of motor 240 may be connected to an electrical generator or other suitable auxiliary load.

In operation, power system 230 is actuated by vertical relative movement between wheel 10 and frame 22. When wheel 10 moves upwardly relative to frame 22, the transmission link 190 is driven upwardly and crank 192A is pivoted on standard 194 in a clockwise direction, forcing the piston in pump 198 downward and forcing hydraulic fluid out of port 202 through check valve 236 and into hydraulic motor 240. The fluid flowing through hydraulic motor 240 thereby actuates the motor. Fluid discharged by motor 240 is drawn through return check valve 244 back into pump 198 through port 200. Fluid is prevented from passing through return check valve 246 by the pressurized fluid on the opposite side of valve 246.

On the reverse movement of transmission link 190, in a downward direction, crank 192A pivots in a counterclockwise direction and drives the piston of pump 198 upwardly. This forces fluid out of port 200 and through check valve 234 into the inlet 238 of hydraulic motor 240. In this instance the fluid discharged from motor 240 is drawn through check valve 246 back into the pump 198 through port 202, return check valve 244 being blocked by the pressure from port 200. Thus power system 230 again provides a shock absorption action for movement of wheel 10 and a conversion of the vertical movements of the wheel into useful energy.

The standards 194 and 232 of FIGS. 6 and 7 act as a fulcrum for pivotally mounting crank 192 or 192A. In both systems, the transmission link 190 is pivotally mounted on the crank closer to the standard than is the piston rod 196; consequently, the crank acts as a lever which amplifies the vertical movement of transmission link 190. Because of this amplification of the vertical movements, even the vertical vibrations and small oscillations of the vehicle wheel 10 is effective to actuate pump 198 for efficient energy conversion.

Of course, system 230 (FIG. 7), and the previously described systems as well, can be connected to charge the batteries of an electrically-driven vehicle and thus increase the efficiency of the vehicle operation. In this respect, any reference to "auxiliary power systems" in this specification and in the appended claims should be construed to include the storage batteries of an electrically-powered vehicle, as well as batteries used for accessories in a more conventional engine-driven vehicle. By the same token, conversion to electrical energy can be accomplished through an A.C. generator (alternator) as well as by means of a D.C. generator.

I claim:

1. An auxiliary power and suspension system for an automotive vehicle or the like, comprising a vehicle frame, a body mounted on the frame, auxiliary equipment for the vehicle and a plurality of supporting wheels for the vehicle, said auxiliary power and suspension system comprising:

suspension means for mounting the wheels on the vehicle frame, said suspension means allowing limited vertical movement of the wheels relative to the frame in response to irregularities and changes in contour of terrain traversed by the wheels;

power transmission means, connected to at least two wheels and to the vehicle frame, for actuation in response to relative vertical movement therebetween;

and power conversion means, connected and actuated by said power transmission means, for converting mechanical kinetic energy applied to said power conversion means through said power transmission means into another energy form more readily useable in operation of said auxiliary equipment;

said power conversion means comprising hydraulic pump means comprising a plurality of double-acting cylinders, a reciprocal piston dividing each into two chambers, and inlet-outlet ports in said chambers;

a transmission line communicating with said chambers through said inlet-outlet ports, valve means in the transmission line to regulate the flow of hydraulic fluid;

and hydraulic motor means communicating directly through said transmission line and valve means with said chambers and actuated by the hydraulic pressure therein;

said motor means, transmission line, valve means and at least one chamber of each double-acting cylinder comprising a generally fluid tight hydraulic circuit substantially completely filled with fluid and operable independent of any system reservoir; and said auxiliary power and suspension system supporting the entire weight of the vehicle which acts on said wheels.

2. An auxiliary power and suspension system according to claim 1 in which the hydraulic pump means comprises double-acting, adjustable cushion cylinder pumps associated with each wheel of the vehicle, each pump affording a hydraulic cushion in each chamber of its respective cylinder, and the entire vehicle weight supported by each of said wheels is transmitted from the vehicle frame to said one wheel through a hydraulic cushion of the associated pump, each pump functioning as both the only spring and only shock absorber for each wheel.

3. An auxiliary power and suspension system according to claim 1, further including at least two independent motor means, two of which are independently actuated by the hydraulic pressure of said upper chambers and lower chambers of said double-acting cylinders respectively.

4. An auxiliary power and suspension system according to claim 1, further including an adjustable hydraulic pressure accumulator for maintaining sufficient hydraulic pressure in said system so that a hydraulic fluid cushion will be maintained in said hydraulic pump means for supporting the vehicle weight.

5. An auxiliary power and suspension system according to claim 1 wherein said motor means has an inlet and outlet through which the motor means communicates with the transmission line, and further including a hydraulic pressure accumulator, in communication with the transmission line, for storing hydraulic pressure during operation of the power transmission means for subsequent actuation of said motor means when the power transmission means is stationary and check valve means associated with the accumulator and transmission lines to permit fluid flow to the accumulator solely from the outlet of the motor means and fluid flow from the accumulator solely to the inlet of the motor means.

6. An auxiliary power and suspension system according to claim 1, further including a helical compression spring in the lower chamber of each double-acting cylinder to support a portion of the vehicle weight.

7. An auxiliary power and suspension system according to claim 1, in which the power transmission means comprises a lever and fulcrum for amplifying the vertical movement between the wheels and frame, thereby affording a substantial mechanical advantage for converting relatively small wheel movements into movements of larger amplitude suitable for derivation of substantial power output from said pump.

8. An auxiliary power and suspension system according to claim 7, in which the power transmission means comprises a transmission link, a crank, a piston rod and a fulcrum;

said transmission link connecting the vehicle wheel to one end of the crank, said piston rod connecting the piston to the other end of the crank; and a fulcrum rigidly affixed to said frame adjacent the said one end of the crank;

said crank being pivotally mounted on said fulcrum so that even a small vertical movement of the vehicle wheel will cause a substantial vertical displacement of the hydraulic pump piston.

9. An auxiliary power and suspension system according to claim 7, in which the power transmission means comprises a transmission link, a crank, a piston rod and a fulcrum;

said piston rod connecting the hydraulic pump piston to one end of the crank, said fulcrum rigidly affixed to the vehicle frame, said fulcrum being rotatably connected to the other end of said crank, said transmission link having one end connected to the vehicle wheel and the other end pivotally connected to the crank at a point adjacent the said other end.

10. An auxiliary power and suspension system according to claim 1, further including an electrical generator, driven by said motor means, for converting the mechanical output of said motor means to electrical energy.

* * * * *